United States Patent

[11] 3,593,588

| [72] | Inventor | Alexander B. Hulse<br>55 Austin Pl., Staten Island, N.Y. 10304 |
|---|---|---|
| [21] | Appl No | 823,068 |
| [22] | Filed | May 8, 1969 |
| [45] | Patented | July 20, 1971 |

[54] ACTUATOR USING ROLLER TRANSMISSION
10 Claims, 8 Drawing Figs.

[52] U.S. Cl. ............................................. 74/89, 74/502
[51] Int. Cl. ........................................... F16h 27/02, F16c 1/10
[50] Field of Search ............................ 74/89, 25, 424.8, 491, 502, 503

[56] References Cited
UNITED STATES PATENTS

| 1,346,625 | 7/1920 | Woodward, Jr. | 74/25 |
| 1,487,702 | 3/1924 | Barr | 74/25 |
| 2,104,122 | 1/1938 | Goates | 74/502 |
| 3,009,223 | 11/1961 | Patrignani | 74/89 |
| 3,038,979 | 6/1962 | Yanikoski | 74/501.5 |
| 2,394,676 | 2/1946 | Finn | 74/110 |

Primary Examiner—William F. O'Dea
Assistant Examiner—Wesley S Ratliff, Jr.
Attorneys—John J. McGlew and Alfred E. Page ABSTRACT: An actuator includes a closed circulating ball or roller system arranged in a defined path, particularly a combined arcuate and linear path, constructed to facilitate a linear and rotary motion change. In one embodiment, the actuator includes a housing defining a closed ball channel which includes a central loop portion for transmitting rotary motion and one or more end linear portions for transmitting linear motion. The loop portion is arranged to surround a central cylindrical cavity for a rotary vane member or disc which includes a radially outwardly projecting portion which is formed with a ball head.

PATENTED JUL20 1971 3,593,588

INVENTOR.
ALEXANDER B. HULSE
BY

McGlew & Toren
ATTORNEYS

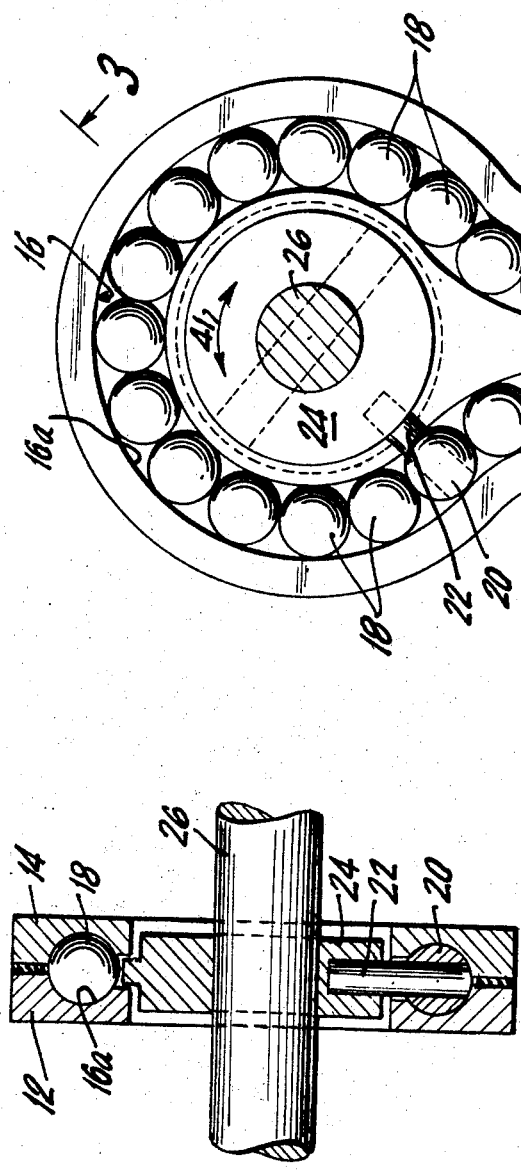
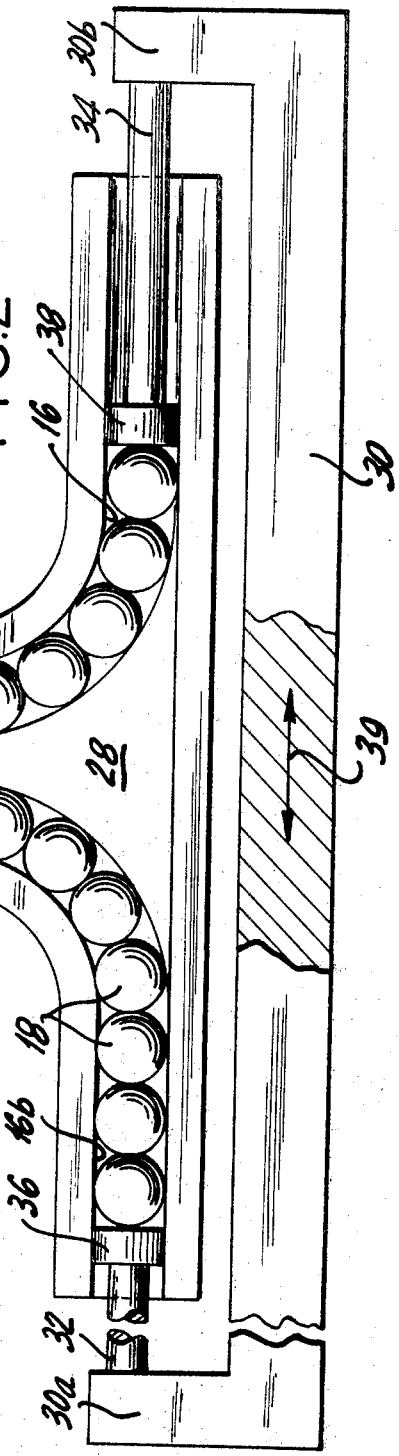

INVENTOR.
ALEXANDER B. HULSE
BY
McGlew & Toren
ATTORNEYS

ACTUATOR USING ROLLER TRANSMISSION

SUMMARY OF THE INVENTION

This invention relates in general to actuators and in particular to a new and useful actuator having a closed ball channel which includes both linear and arcuate portions and with ball-like elements therein which engage a rotary vane member at one end and a linear member at the opposite end of the channel.

The present invention provides an improved actuator construction using a closed ball system to provide a change from rotary to linear motion or vice versa. The invention is an improvement over the prior art particularly in respect to the construction and arrangement of a closed ball channel and the arrangement of ball-like elements in the channel to cooperate with a vane or rotor of particular construction. In one embodiment of the invention, an actuator of this type includes a rotary member having a vane with a ball head which projects into the ball channel and is positioned between two balls or rollers therein for circulating therewith. The ball channel includes linear end portions and the balls or rollers at each end of these linear end portions bear against linearly movable elements which may, for example, be connected to a common slide. The arrangement provides a simple and inexpensive housing and a vane actuator construction for facilitating a change of motion from rotary to linear or vice versa.

In another embodiment of the invention the closed housing provides a ball channel with arcuate and linear portions and a rotary member or vane, disposed between the ball circulated in the channel, and which is of segmental configuration. A feature of this embodiment is that the linear member includes widened end portions which bear against the balls arranged in two parallel but offset linear passages at each end of the loop portion of the ball channel in which a plurality of ball-like elements in rolling contact are positioned.

In a still further embodiment an actuator housing for a hydraulically operated device includes a ball channel having an arcuate portion with only one linear portion at one end. The arcuate portion provides accommodation for a sector-shaped projection of a rotary member which may be rotated to displace the balls in the housing ball channel to displace a plunger bearing against the balls. The plunger extends into the linear ball channel portion at one end and its opposite end moves within a fluid space of a fluid cylinder. The actuation may be effected by movement of the rotary member with the sector to displace the plunger in the cylinder and increase the fluid pressure for actuating a part, such as a brake; or the actuation may be in a reverse direction.

Accordingly, it is an object of the invention to provide an improved device for transferring from one type of motion to the other and using a system with a closed ball channel in which balls are permitted to circulate and wherein the balls bear against a rotary member and a linear member which are interposed in the channel and particularly to an improved construction of the channel arrangement and the vane elements which are moved by the recirculation of the balls.

A further object of the invention is to provide an actuator which is operated by the movement of balls in a closed ball channel and which includes both arcuate and linear portions and to an improved vane construction therefor.

A further object of the invention is to provide an actuator in the form of a hydraulically operated element which includes a ball channel in which ball members are located and moved through linear and arcuate channel portions for transmitting linear or arcuate movements.

A further object of the invention is to provide an actuator which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its uses, reference should be had to the accompanying drawings and descriptive matter in which there are illustrated preferred embodiments of the invention.

IN THE DRAWINGS

FIG. 2 is a section taken along the line 2-2 of FIG. 1;

FIG. 3 is a section taken along the line 3-3 of FIG. 2;

GENERAL DESCRIPTION OF THE PREFERRED EMBODIMENTS

Figure 1:
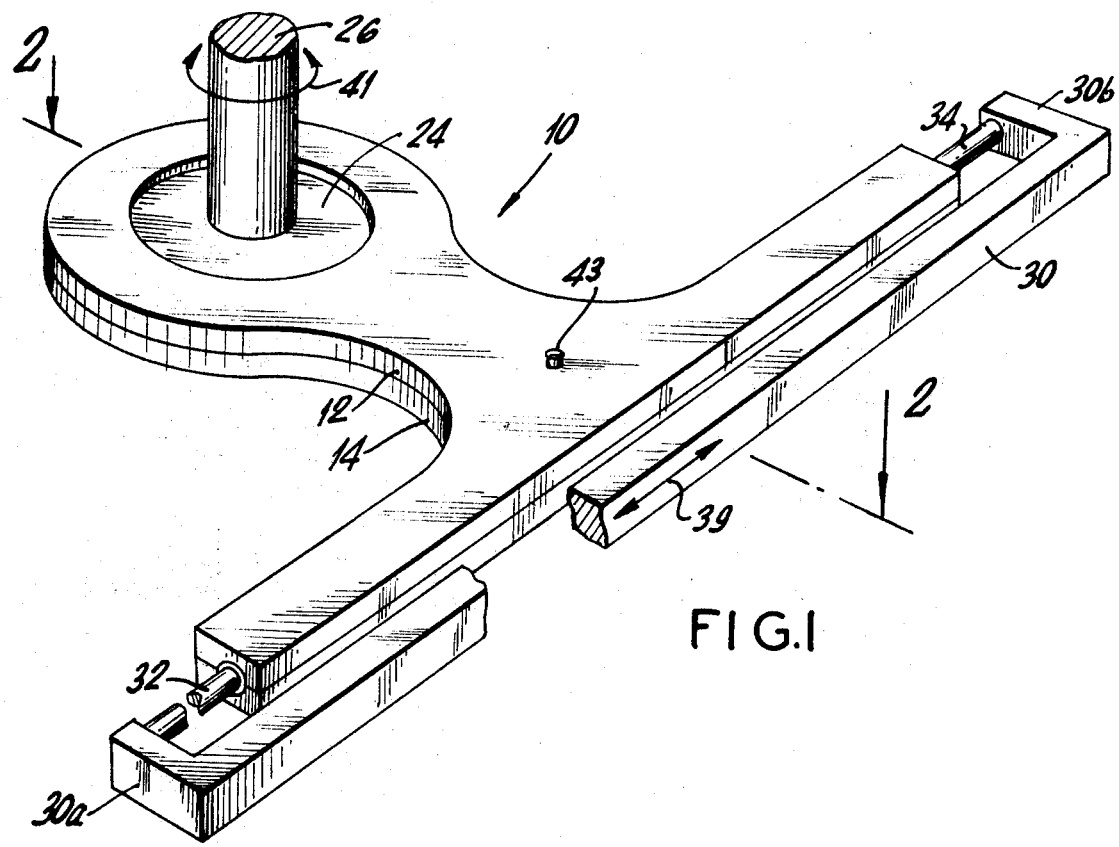
FIG. 1 is a top perspective view of an actuator constructed in accordance with the invention.

Referring to the drawings in particular, the invention embodied therein as indicated in FIGS. 1—3 includes an actuator generally designated 10 for converting rotary to linear motion, or rotary to rotary motion, or linear to rotary motion. The actuator 10 includes a housing having two parts 12 and 14 which are fitted together and define therein the closed ball channel generally designated 16 and secured by bolts 17 and which includes an arcuate portion 16a and linear portions 16b and 16c at each end of the arcuate portion. A plurality of ball-like elements such as spherical balls or rollers 18 are loaded into the ball channel 16 and they extend throughout the arcuate and linear portions of the channel 16.

In accordance with the invention, a ball vane or vane member 20 is carried on a radial extension 22 of a rotary disc 24 which is keyed or pinned to a shaft 26 for rotation therewith. The ball vane is interposed between the balls 18 which are confined in the ball channel 16. The disc 24 closes a slot defined between the portions 12 and 14 of the housing and the interior of the housing defines a grease cavity 28 which communicates with the groove 16 to insure that the balls 18 and ball vane 20 are maintained in proper lubrication.

The actuator indicated in FIGS. 1—3 includes a linearly movable slide or control member having in-turned end portions 30a and 30b which are disposed exteriorly of the respective ends of the linear portions 16b and 16c. Push rods 32 and 34 carried at the respective ends terminate in plungers 36 and 38 which bear against the respective end balls of the balls 18 which are arranged in the grooves 16. The slide 30 may move in either direction as indicated by the arrow 39, and the rotary disc 24 with its shaft 26 may be rotated in either direction as indicated by the arrow 41. The linear movement of the slide 30 will cause a rotatable movement of the shaft 26 and the rotatable movement of the shaft 26 will cause a linear movement of the slide 30. It should be appreciated that the balls 18 may be replaced by rollers and, if desired, the ball vane 20 may be replaced by a sector. A grease fitting 43 is located on the housing part 12.

Figures 5, 8:
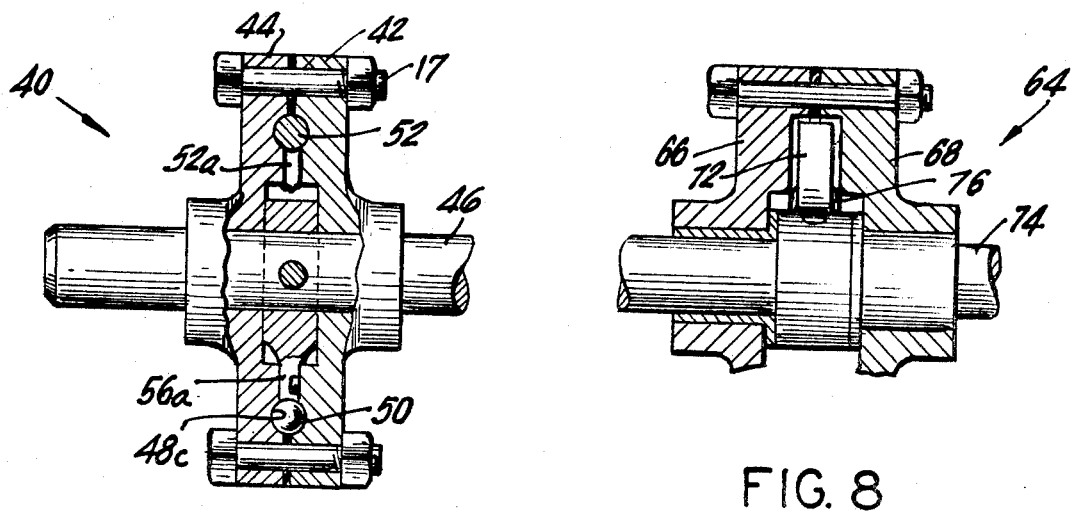
FIG. 5 is a section taken along the line 5-5 of FIG. 4.
FIG. 8 is a section taken along the line 8-8 of FIG. 6.
Figure 4:
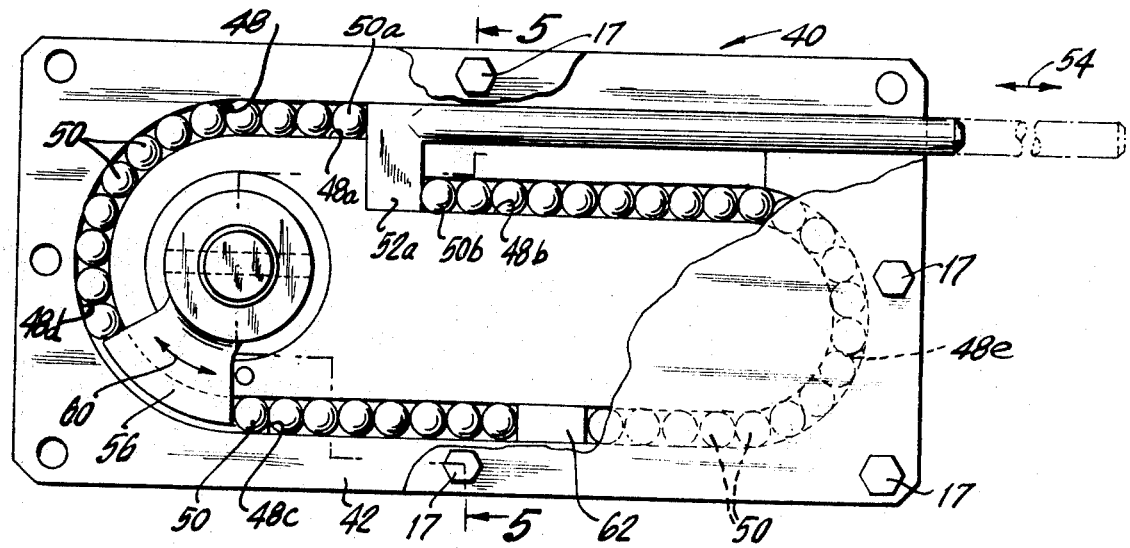
FIG. 4 is a plan view partly in section of another embodiment of the invention.

In the embodiment illustrated in FIGS. 4 and 5, there is provided an actuator generally designated 40 which includes housing parts 42 and 44 which are fitted together around a central shaft 46 and secured by bolts 17. The parts 42 and 44 define an interior continuous ball channel 48 which has linear portions 48a, 48b and 48c and two arcuate portions 48d and 48e. The linear portions 48a and 48b are arranged parallel to each other but offset. Balls or rollers 50 are filled into the channel 48 in a manner such that end ball 50a and the linear groove portion 48a bears against an end of a plunger member 52 and end ball 50b bears against an extension 52a of the plunger member but from the opposite side thereof. Movement of the plunger 52 in either direction as indicated by the arrow 54 will cause a displacement of the balls 50 in the channel 48.

A rotary vane or sector member 56 is carried on the shaft 46 for rotation therewith and it has a cylindrically shaped end portion 56a (FIG. 5) which is confined in the ball or roller groove 48. The sector end portion 56a bears at its respective ends against respective balls 50 in the ball channel 48 and movement of the sector in either direction of rotation, as indicated by the arrow 60, will cause a respective displacement of the balls in the direction of the movement.

A feature of the construction indicated at FIG. 4 is that the actuator may be operated completely free of backlash by inserting a takeup piece 62 between two of the balls in the channel 48 to take up any backlash which may be present.

The plunger 52, when it moves in either direction as indicated by the arrow 54, will cause a corresponding rotary movement of the shaft 46 as indicated by the arrow 60. Similarly, a reverse condition will occur when the shaft 46 is rotated, the plunger will be displaced correspondingly in one of the directions indicated. The actuator of FIGS. 4 and 5 may be used with balls 50 or rollers and the configuration of the sector 56 and the housing may, of course, be varied in accordance with the particular application for which the device is to be employed.

Figure 6:
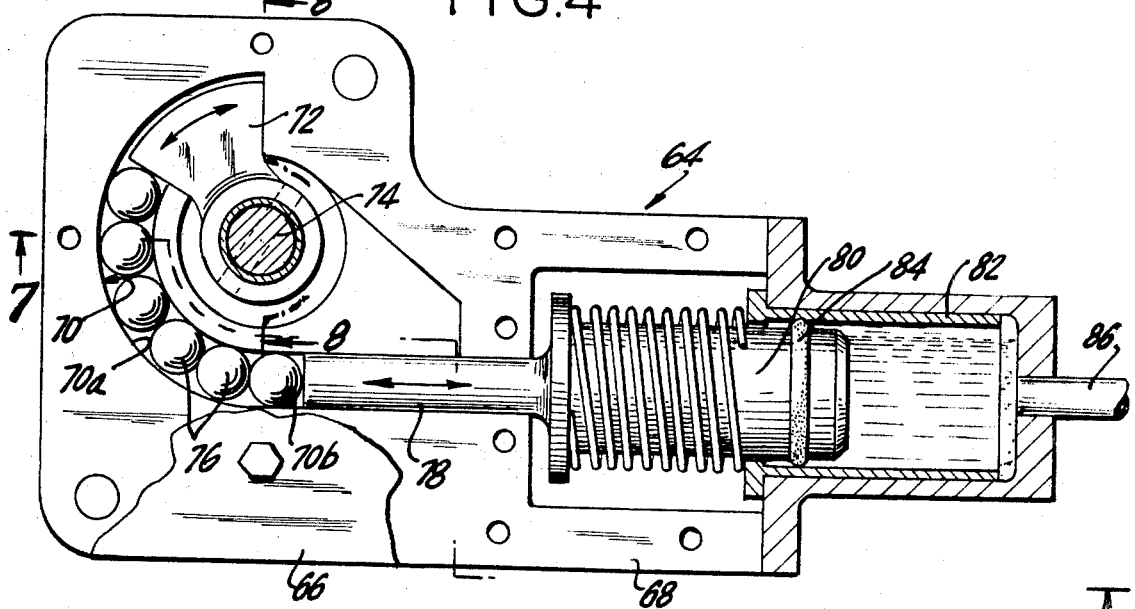
FIG. 6 is a plan view partly in section of still another embodiment of the invention.
Figure 7:
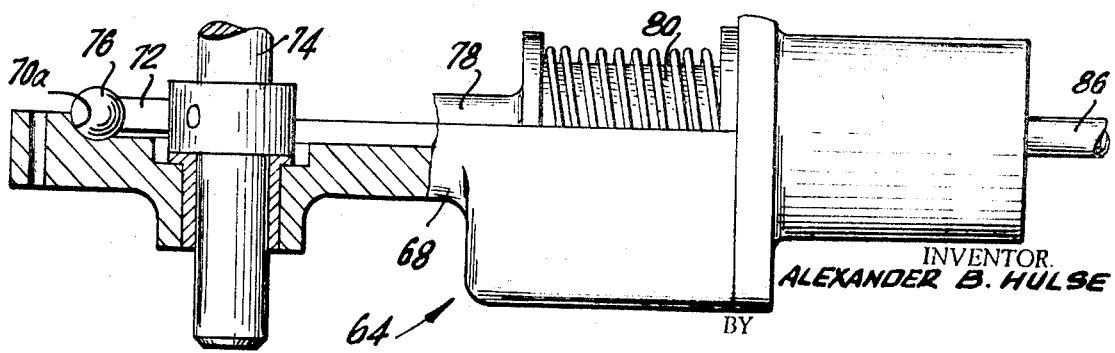
FIG. 7 is a section taken along the line 7-7 of FIG. 6.

In the embodiment indicated in FIGS. 6—8, there is provided an actuator generally designated 64 which is the form of a hydraulic sender which may be employed for brakes, controls or similar apparatus. The actuator includes a housing with upper and lower portions 66 and 68 which fit together to define a ball channel 70 having an arcuate or curved portion 70a and a linear portion 70b. The ball channel 70 is closed at one end by an arcuate member or vane 72 which is affixed to a shaft 74 for rotation therewith. The shaft 74 may be operated or rotated, for example, by a foot pedal, a crankshaft or similar linkage which may be rotated to cause a displacement of balls or rollers 76 in the channel 70. The balls 76 are disposed between the vane 72 and an end of a plunger member 78 having a plunger portion 80 which is disposed in a fluid cylinder 82 defined within the actuator housing. The plunger carries an O-ring 84 which forms a seal within the cylinder 82 and the fluid pressure of the cylinder communicates through a tube 86 to a control to be actuated, or source of fluid pressure such as a compressed air tank. The actuator 64 may be operated in response to rotation of the shaft 74 to displace the vane 72 in a rotary manner and the plunger 78 in a linear manner. In such event, the displacement of the plunger 80 will cause an increase in the pressure of the cylinder 82 which will be transmitted through the tube 86 for actuation of a suitable control. Alternatively, the pressure in the tube 86 may cause the actuation of the device by displacing the plunger 80 either to the left or to the right to cause a corresponding rotary displacement of the shaft 74.

Each of the ball grooves 16, 48, 70 etc. may be provided with lubrication or they may be made of material such as a teflon plastic which has a characteristic that will permit this low friction rolling movement.

I claim:

1. A reversing movable and reversely drivable actuator for continuously driving without increment through either a linearly movable member or a rotary movable member comprising a housing defining a continuous channel having at least one arcuate and one linear portion. A rotary member disposed centrally of the arcuate portion of the housing channel and having a radially extending vane with a portion confined for movement in the channel arcuate portion, a linearly movable member having a portion confined for movement in the linear portion of the channel, and a plurality of individual ball-like elements disposed between said vane portion and said member in continuous touching rolling contact with each other and with said vane portion and said member, rotary movement of said vane portion being transmitted through said ball-like elements to said linearly movable member for linear movement thereof and linear movement of said linear member being transmitted through said ball-like elements to said vane member for rotary movement thereof.

2. An actuator, according to claim 1, wherein said channel includes a linear portion at each end of said arcuate portion, said linear member including a portion extending into each of said linear channel portions and bearing against said ball-like elements.

3. An actuator, according to claim 2, wherein said arcuate portion is substantially annular, said rotary member comprising a shaft centrally located within said annular arcuate portion, said vane comprising a ball-shaped portion disposed within said channel between adjacent ball-like members.

4. An actuator comprising a housing defining a continuous channel having at least one arcuate and one linear portion, a rotary member disposed centrally of the arcuate portion of the housing channel and having a radially extending vane with a portion confined for movement in the channel arcuate portion, a linearly movable member having a portion confined for movement in the linear portion of the channel, and a plurality of individual ball-like elements disposed between said vane portion and said member in touching rolling contact with each other and with said vane portion and said member, rotary movement of said vane portion being transmitted through said ball-like elements to said member and linear movement of said linear member being transmitted through said ball-like elements to said vane member for rotary movement thereof, said housing comprising two parts which are assembled together to define said channel and including a central substantially annular arcuate portion and a linear portion adjacent said arcuate portion extending outwardly from each side thereof, said linearly movable member comprising a slide having end portions extending inwardly in opposite directions into respective linear channel portions at each end of said arcuate portion of said housing.

5. An actuator comprising a housing defining a continuous channel having at least one arcuate and one linear portion, a rotary member disposed centrally of the arcuate portion of the housing channel and having a radially extending vane with a portion confined for movement in the channel arcuate portion, a linearly movable member having a portion confined for movement in the linear portion of the channel, and a plurality of individual ball-like elements disposed between said vane portion and said member in touching rolling contact with each other and with said vane portion and said member, rotary movement of said vane portion being transmitted through said ball-like elements to said member and linear movement of said linear member being transmitted through said ball-like elements to said vane member for rotary movement thereof, said housing defining a continuous channel which includes first and second spaced arcuate portions, a first linear portion joining one side of said first and second arcuate portions and a second and third linear portion extending outwardly from the opposite sides of each of said arcuate portions but being offset, said linearly movable member including an end bearing against the ball-like members of the second linear portion in one direction and against the ball-like elements of the third linear portion in an opposite direction.

6. An actuator, according to claim 5, including a takeup piece disposed between said ball-like elements within said continuous channel to remove backlash between said ball-like elements.

7. An actuator, according to claim 1, wherein said continuous channel includes a semiannular arcuate portion, said vane closing off one end of said annular arcuate portion, said linear member being a plunger, a fluid cylinder surrounding said plunger, said plunger being movable in said fluid cylinder for changing the fluid pressure therein.

8. An actuator according to claim 7, including spring means associated with said plunger biasing said plunger in a direction toward engagement with said ball-like elements.

9. An actuator, according to claim 8, wherein said vane comprises a segment.

10. An actuator, according to claim 9, including a conduit connected to said fluid cylinder for transmitting fluid pressure in response to movement of said plunger and for moving said plunger.